United States Patent
Yamada et al.

(10) Patent No.: US 7,298,720 B2
(45) Date of Patent: Nov. 20, 2007

(54) PACKET COMMUNICATION SYSTEM, COMMUNICATION NETWORK, AND METHOD FOR SELECTING IP ADDRESS IN MOBILE NODE

(75) Inventors: Mariko Yamada, Tokyo (JP); Masashi Yano, Yokohama (JP); Akira Date, Kunitachi (JP); Takumi Oishi, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 762 days.

(21) Appl. No.: 10/611,855

(22) Filed: Jul. 3, 2003

(65) Prior Publication Data
US 2004/0176095 A1    Sep. 9, 2004

(30) Foreign Application Priority Data
Mar. 3, 2003 (JP) ............................. 2003-055694

(51) Int. Cl.
*H04Q 7/20* (2006.01)
(52) U.S. Cl. .................. 370/331; 370/345; 370/349; 455/445
(58) Field of Classification Search ............ 455/432.1, 455/433
See application file for complete search history.

(56) References Cited

U.S. PATENT DOCUMENTS

| | | | |
|---|---|---|---|
| 6,578,085 B1* | 6/2003 | Khalil et al. | 709/241 |
| 6,917,605 B2* | 7/2005 | Kakemizu et al. | 370/338 |
| 7,031,709 B2* | 4/2006 | Watanabe et al. | 455/436 |
| 7,092,986 B2* | 8/2006 | Wang | 709/202 |
| 7,103,023 B2* | 9/2006 | Sakakura | 370/331 |
| 2002/0009066 A1* | 1/2002 | Shimizu et al. | 370/338 |
| 2002/0191576 A1* | 12/2002 | Inoue et al. | 370/338 |
| 2003/0026241 A1 | 2/2003 | Ono et al. | |
| 2003/0158938 A1* | 8/2003 | Adatrao et al. | 709/225 |
| 2003/0224788 A1* | 12/2003 | Leung et al. | 455/435.1 |
| 2003/0229697 A1* | 12/2003 | Borella | 709/226 |
| 2004/0029555 A1* | 2/2004 | Tsai et al. | 455/403 |
| 2004/0081118 A1* | 4/2004 | Mukherjee et al. | 370/328 |
| 2004/0202183 A1* | 10/2004 | Thubert et al. | 370/395.31 |
| 2005/0020265 A1* | 1/2005 | Funabiki et al. | 455/436 |

FOREIGN PATENT DOCUMENTS

JP    2003-18192    6/2001

OTHER PUBLICATIONS

D. Johnson, C. Perkins, and J. Arkko, "Mobility Support in IPv6", IETF Mobile IP Working Group, Jan. 20, 2003, pp. 1-126.

* cited by examiner

*Primary Examiner*—George Eng
*Assistant Examiner*—Brandon J. Miller
(74) *Attorney, Agent, or Firm*—Reed Smith LLP; Stanley P. Fisher, Esq.; Juan Carlos A. Marquez, Esq.

(57) ABSTRACT

The invention provides a method for selecting a communication IP address whereby traffic of a network can be reduced and a session with the partner of communication can be maintained even when the mobile node has moved. The method prescribes provision of means for judging a state of a foreign network to which the mobile node is connected, and means of monitoring an IP address that an application having been started by the mobile node is using for communication, and enables selection of the mobile IP address so that the mobile node can maintain the session surely even in a visited foreign network.

9 Claims, 12 Drawing Sheets

FIG.5

411 HOME AGENT LIST

| 4111<br>HA ADDRESS | 4112<br>HA LINK LOCAL ADDRESS | 4113<br>PRIORITY | 4115<br>LIFE TIME |
|---|---|---|---|
| 3ffe:8340:1049: :15 | fe80: :15 | 0 | 60 |
| 2000:1111:2222: :10 | fe80: :10 | 0 | 300 |
| 2000:3333:2222: :10 | fe80: :10 | 0 | 120 |
| : | : | : | : |
| : | : | : | : |
| : | : | : | : |

FIG.6

412 BINDING LIST

| 4121 DESTINATION | 4122 CARE-OF ADDRESS | 4123 HOME ADDRESS | 4124 LIFE TIME |
|---|---|---|---|
| 3ffe:8340:1049: :15 | 2000:1111:2222: :1000 | 3ffe:8340:1049: :1000 | 300 |
| 2000:3333:2222: :10 | 2000:1111:2222: :1000 | 3ffe:8340:1049: :1000 | 53 |
| 2000:3333:2222: :10 | 2000:1111:2222: :1000 | 3ffe:8340:1049: :1000 | 29 |
| : | : | : | : |
| : | : | : | : |
| : | : | : | : |
| : | : | : | : |

FIG.7

503 ON-COMMUNICATION ADDRESS MANAGEMENT TABLE

| 5031<br>APPLICATION | 5032<br>USE IP ADDRESS | 5033<br>ADDRESS |
|---|---|---|
| A | 3ffe:8340:1049: :1000/64 | HOME ADDRESS |
| B | 3ffe:8340:1049: :1000/64 | HOME ADDRESS |
| C | 2000:3333:2222: :1000/64 | CARE-OF ADDRESS |
| D | 3ffe:8340:1049: :1000/64 | CARE-OF ADDRESS |
| E | 3ffe:8340:1049: :1000·64 | HOME ADDRESS |
| F | 2000:3333:2222: :1000·64 | CARE-OF ADDRESS |
| ⋮ | ⋮ | ⋮ |
| ⋮ | ⋮ | ⋮ |
| ⋮ | ⋮ | ⋮ |

MN: MOBILE NODE
FN: FOREIGN NETWORK
HA: HOME AGENT

PACKET COMMUNICATION SYSTEM, COMMUNICATION NETWORK, AND METHOD FOR SELECTING IP ADDRESS IN MOBILE NODE

BACKGROUND OF THE INVENTION

1. Field of the Invention

This invention relates to a communication system that uses mobile IP, and especially relates to a method for selecting a communication IP address in a mobile node that moved from its home network to a foreign network.

2. Description of the Related Art

In the Internet, it is common that when a mobile node moved among networks, the mobile node newly acquires an IP address in a network to which it moved (hereinafter sometimes referred to as "visited") and performs communication with it.

On the other hand, IETF is now standardizing a method whereby a mobile node performs communication in a visited network to which it moved (hereinafter a network being referred to as a "foreign network") without altering the IP address of the mobile node by using the IP address that has been assigned to the mobile node (hereinafter referred to as a "home address") in a network to which the mobile node is usually attached (hereinafter referred to as a "home network").

In "Mobility Support in IPv6" (David B. Johnson, draft-ietf-mobileip-ipv6-20.txt, Jan/2003) that is being examined in IETF (hereinafter referred to as a "mobile IP"), a terminal that wishes to communicate with a mobile node sets a destination IP address as the mobile node's home address and sends an IP packet. The IP packet that was routed to the mobile node's home address is captured by the mobile node's home agent and is transferred after being encapsulated to a foreign network visited by the mobile node.

In order to encapsulate and forward the IP packet that was received, the home agent receives a binding update from the mobile node and manages association between the mobile node's home address and the IP address that the mobile node acquired in the foreign network (hereinafter referred to as a "care-of address"). This procedure makes it possible for the mobile node to receive the IP packet addressed to its home address in the foreign network. When communication starts between the mobile node and the terminal, the binding update will be sent to the terminal of a partner of communication from the mobile node; therefore, it is also possible for the mobile node and the terminal to communicate directly between each other henceforth not via the home agent but by using a routing header that is an extension header of IPv6. Moreover, if a home agent exists on a first foreign network that is a network visited by the mobile node, after the mobile node has moved to a second foreign network, it is also possible to forward a packet addressed to the mobile node to the mobile node residing in the second foreign network by sending the binding update to the first foreign network's home agent.

[Non-Patent Literature 1]

David D. Johnson et al. "Mobility Support in IPv6 draft-ietf-mobileip-ipv6-20.txt," obtained online from IETF on Jan. 20, 2003, also available from the Internet <http://www.ietf.org/internet-drafts/draft-ietf-mobileip-ipv6-20.txt> [searched on Feb. 5, 2003]

With the technology described above, the mobile node will be able to communicate with the terminal using its home address even when it has moved among networks. Moreover, the mobile node in a foreign network can select either its home address or the care-of address that was acquired in the foreign network as a communication address.

For example, if the communication address is set to the mobile node's home address, the mobile node can receive a packet surely even when it moves from one network to another. However, in this case, since the IP packets are encapsulated and forwarded by the home agent to reach the mobile node, an overhead of communication is created. After the start of the communication, it is possible to eliminate the overhead of communication by sending the binding update to a partner of the communication and hence setting up route optimization. However, it is impossible to set up the route optimization from the time of start of the communication.

On the other hand, in the case where the communication address is set to a care-of address, since the mobile node can directly communicate with the partner of communication, the overhead of communication can be eliminated. However, when the mobile node has left the first foreign network and moved to the second foreign network, IP packets addressed to the mobile node that have reached the first foreign network may not be forwarded to the second foreign network, and so there is the possibility that the mobile node may not be able to maintain a session with the partner of communication.

SUMMARY OF THE INVENTION

It is the object of this invention to provide a communication system that uses a mobile IP, a communication network, and a method for selecting an IP address in a mobile node whereby a route can be optimized as much as possible and a session can be maintained even when the mobile node has moved from a foreign network to which the mobile node is currently attached to another foreign network, In order to achieve the above-mentioned object, the communication system is configured to have first and second packet communication devices that are arranged in at least first and second foreign networks, respectively, selected from among a plurality of foreign networks existing as networks visited by the mobile node, wherein when the mobile node has moved to the first foreign network, a first care-of address is given to the mobile node, when the mobile node has moved to the second foreign network, a second care-of address is given to the mobile node, respectively, and after the mobile node has moved from the first foreign network to the second foreign network, when a packet addressed to the first care-of address is transmitted, the first packet communication device forwards the packet to the second packet communication device.

According to this invention, it becomes possible for the mobile node to select such a mobile IP address, as the communication address for communication with a terminal, that enables route optimization to be set up as much as possible while a communication session is maintained even when moving from the first foreign network to the second foreign network.

Thereby, the overhead of communication that increases by processing of encapsulation can be reduced. Moreover, while the mobile node is staying at a foreign network where a temporarily available home agent exists, the mobile node can use that home agent as a temporary home agent, and the mobile node can receive packets that are not encapsulated. Therefore, the communication system can suppress increase of the load that accompanies processing encapsulated packets. Furthermore, even when the mobile node moves to another foreign network, it becomes possible for the mobile node to maintain a session with the partner of communication.

In addition, when the mobile node moves among a plurality of foreign networks, a hand-over time can be kept constant by changing a home agent that is used temporarily and the overhead of communication can be reduced.

BRIEF DESCRIPTION OF THE DRAWINGS

FIG. 5 is a conceptual diagram explaining the composition of a home agent list;

FIG. 6 is a conceptual diagram explaining the composition of a binding list;

FIG. 7 is a conceptual diagram explaining the composition of an on-communication address table;

DETAILED DESCRIPTION OF THE PREFERRED EMBODIMENTS

Hereafter, embodiments according to this invention will be described.

First Embodiment

This invention will be described by giving an example where the mobile node registers the communication IP address dynamically at an IP address management server.

Figure 1:
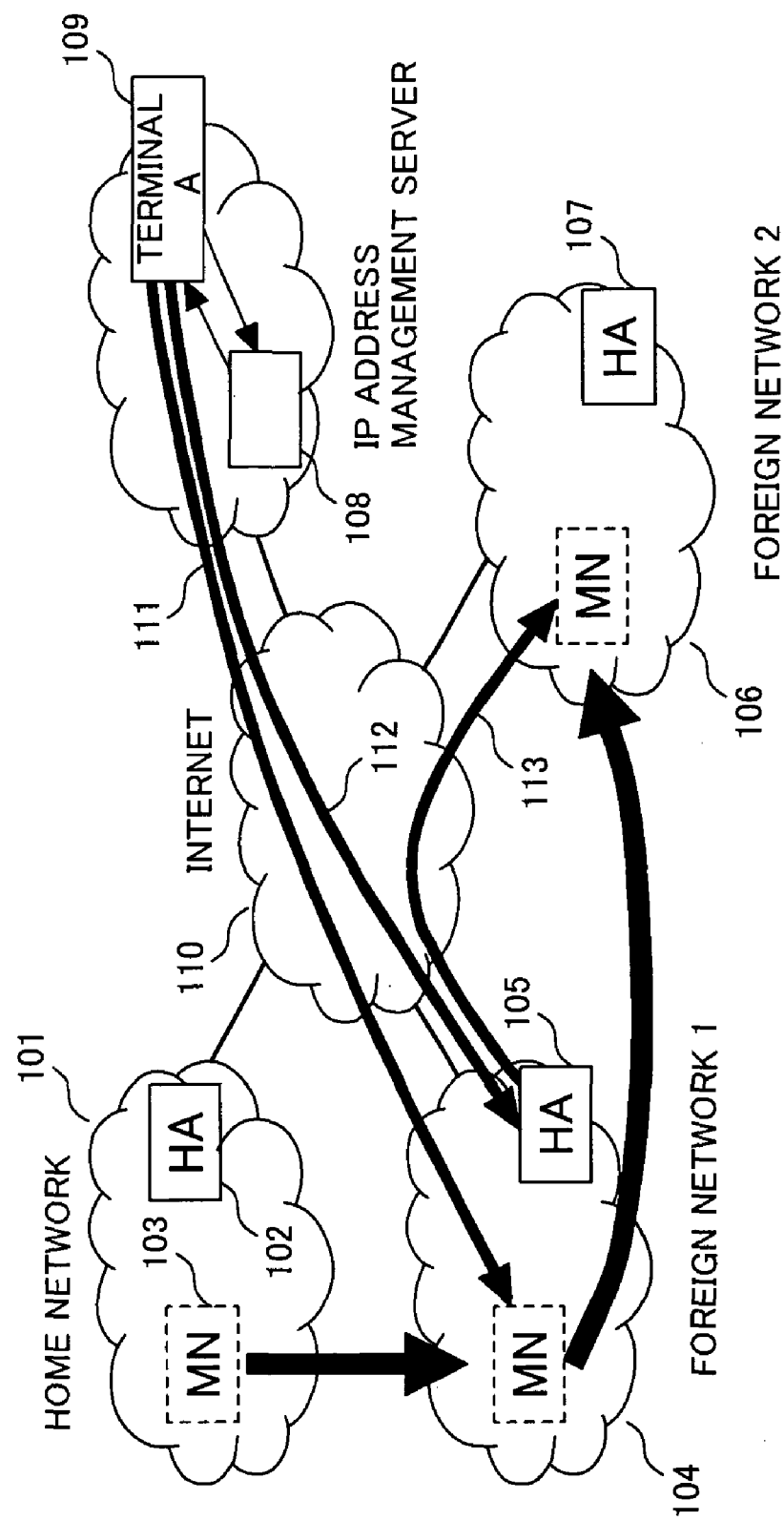
FIG. 1 is an illustration conceptually showing a network to which this invention is applied.

FIG. 1 is a view showing an example of the composition of a mobile IP communication system in which this invention is put into practice. The mobile IP communication system is composed of: a home agent (102), a terminal A (109) that communicates with a mobile node (103), an IP address management server that enables the terminal to resolve an address of the mobile node (103), a home network (101) to which the mobile node (103) is attached and that the home agent (102) of the mobile node (103) belongs to, a foreign network 1 (104) and a foreign network 2 (106) that are networks visited by the mobile node (103), etc.

The home network (101), the foreign network 1 (104), the foreign network 2 (106), and a network that the terminal A (109) belongs to are connected with one another via the Internet (110). The terminal A (109) is assumed as a correspondent node of a mobile IP.

First, the mobile node (103) registers its IP address at an IP address management server (108) in the home network (101). The terminal A (109) inquiries the IP address of the mobile node (103) to the IP address management server (108) and resolves the IP address of the mobile node (103). The communication terminal A (109) starts to communicate with the mobile node (103) using the IP address acquired from the IP address management server (108) as the destination IP address. As will be described below, the IP address management server (108) is capable of dynamically changing an association between an identifier of the mobile node (103) and an IP address based on notification from the mobile node (103).

Figure 2:
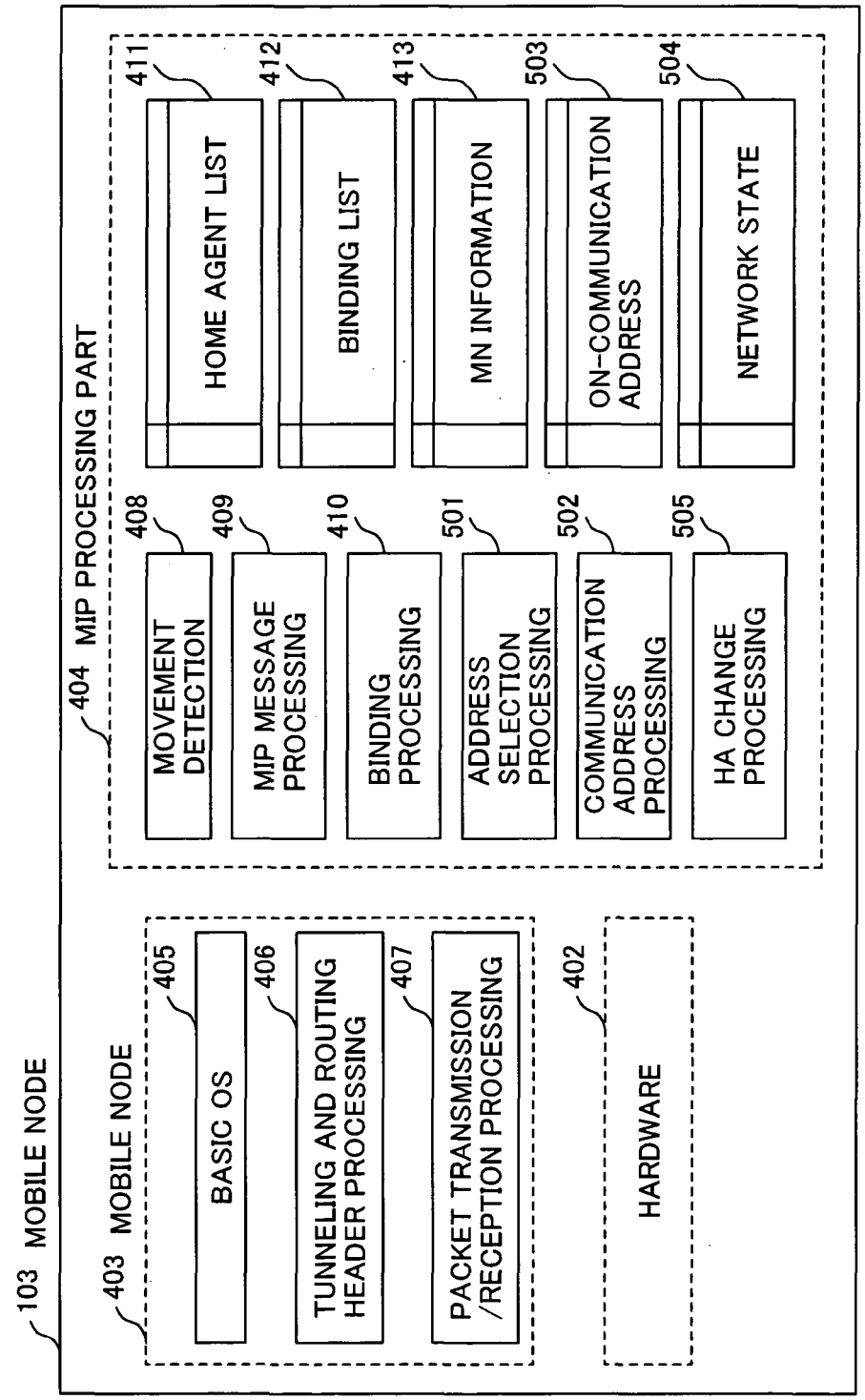
FIG. 2 is a block diagram showing an internal composition of the mobile node used in this invention.

FIG. 2 is a view showing the internal composition of the mobile node (103). The mobile node (103) has an OS (403) on its hardware (402). The OS (403) is assumed to have a packet transmission/reception processing part for transmitting/receiving IP packets (407) and a tunneling and routing header processing part for performing decapsulation of IP packets and the like (406) as well as basic OS functions (405).

The mobile node (103) has also a mobile IP processing part (404) in addition to the hardware (402) and the OS (403).

The mobile IP processing part (404) comprises: a movement detection processing part (408), a mobile IP message processing part (409), a binding management part (410), a home agent list (411), a binding list (412), and a mobile node information table (413).

The mobile IP processing part (404) further comprises: an address selection processing part (501), a communication address management processing part (502), an on-communication address management table (503), a network status table (504), and a home-agent change processing part (505).

The movement detection processing part (408) analyzes a router advertisement that is notified in a network to which the mobile node (103) is currently attached and judges whether the mobile node (103) has moved from a network. The movement detection processing part (408) further judges whether the first foreign network to which the mobile node (103) is currently connected can forward IP packets to a second foreign network in which the mobile node (103) is going to reside next. That is, when a home agent flag is on in a prefix information option of a router advertisement received from the second foreign network, a packet communication device capable of forwarding IP packets addressed to a care-of address, namely a home agent exists, and hence the movement detection processing part (408) judges that forwarding is possible; when the home agent flag is not on, it judges that the forwarding is impossible. The movement detection processing part (408) makes the network state table (504) reflect the judgment result.

When the movement detection processing part (408) receives router advertisements sent from a plurality of routers or home agents, it specifies the routers or home agents that sent out the router advertisement based on link local addresses of source addresses of the respective router advertisements. If a home agent that set a home agent flag on and sent a router advertisement previously sends a router advertisement without setting the flag on, the movement detection processing part (408) judges that a network situation has changed and the home agent has become incapable of the forwarding. Note that in this specification a packet communication device capable of forwarding IP packets addressed to a care-of address is called a home agent, whereas a packet communication device incapable of the forwarding is called a router.

The mobile IP message processing part (409) processes mobile IP messages, such as binding updates and binding acknowledgements.

The binding management part (410) manages information as to which is a terminal under the binding with the mobile node (103). The home agent list (411) is a list of home agents each capable of providing a home agent function to the mobile node (103). As is illustrated in FIG. 5, the home agent list (411) contains at least a home agent's global IP address (4111), a home agent's link local address (4112), a home agent's priority (4113), and a home agent's lifetime (4115). The contents of the home agent list (411) are updated by analyzing the router advertisement in the movement detection processing part (408). For example, in the case where, as was described above, a home agent that notified a router advertisement with a home agent flag being on up to now notifies a router advertisement with the home agent flag not being on, it is judged that a network situation has changed and the home agent has become incapable of the forwarding, and thus the contents of the home agent list (411) are updated.

The binding list (412) is a table for managing destinations to which the mobile node (103) sent the binding updates. As is illustrated in FIG. 6, the binding list (412) contains: a destination of the binding update (4121); a care-of address acquired in the current foreign network (4122); a home address (4123) of the mobile node (103); and a lifetime of the binding list (4124).

The binding list (412) is updated by the mobile IP message processing part (409) and is managed by the binding management part (410). For example, the binding management part (410) judges whether it expired the life time recorded in the binding list (412) (timeout), and if the time is judged to be up, the binding management part (410) further judges whether the binding needs to be updated (continued) based on information of the on-communication address table.

The mobile node information table (413) holds setting information of the mobile node (103), such as the home address of the mobile node (103) and the home agent address.

The address selection processing part (501) selects an IP address to be used for communication by knowing the state of a network to which the mobile node (103) is connected.

The communication address management processing part (502) manages the IP address that an application having been started in the mobile node (103) is using for communication.

The on-communication address management table (503) is a list of IP addresses that applications having been started in the mobile node (103) are using for communication. The on-communication address management part (503) manages kinds of applications (5031) having been started by the mobile node (103) and the IP addresses that the applications (5031) use for IP communication (5032) in cooperation with the OS (403), as is illustrated in FIG. 7. The on-communication address management table (503) also contains an address attribute (5033) that indicates whether the IP address being used for communication is the home address of the mobile node (103) or a care-of address that the mobile node (103) acquired in a foreign network to which the mobile node (103) was previously attached.

Figure 3:
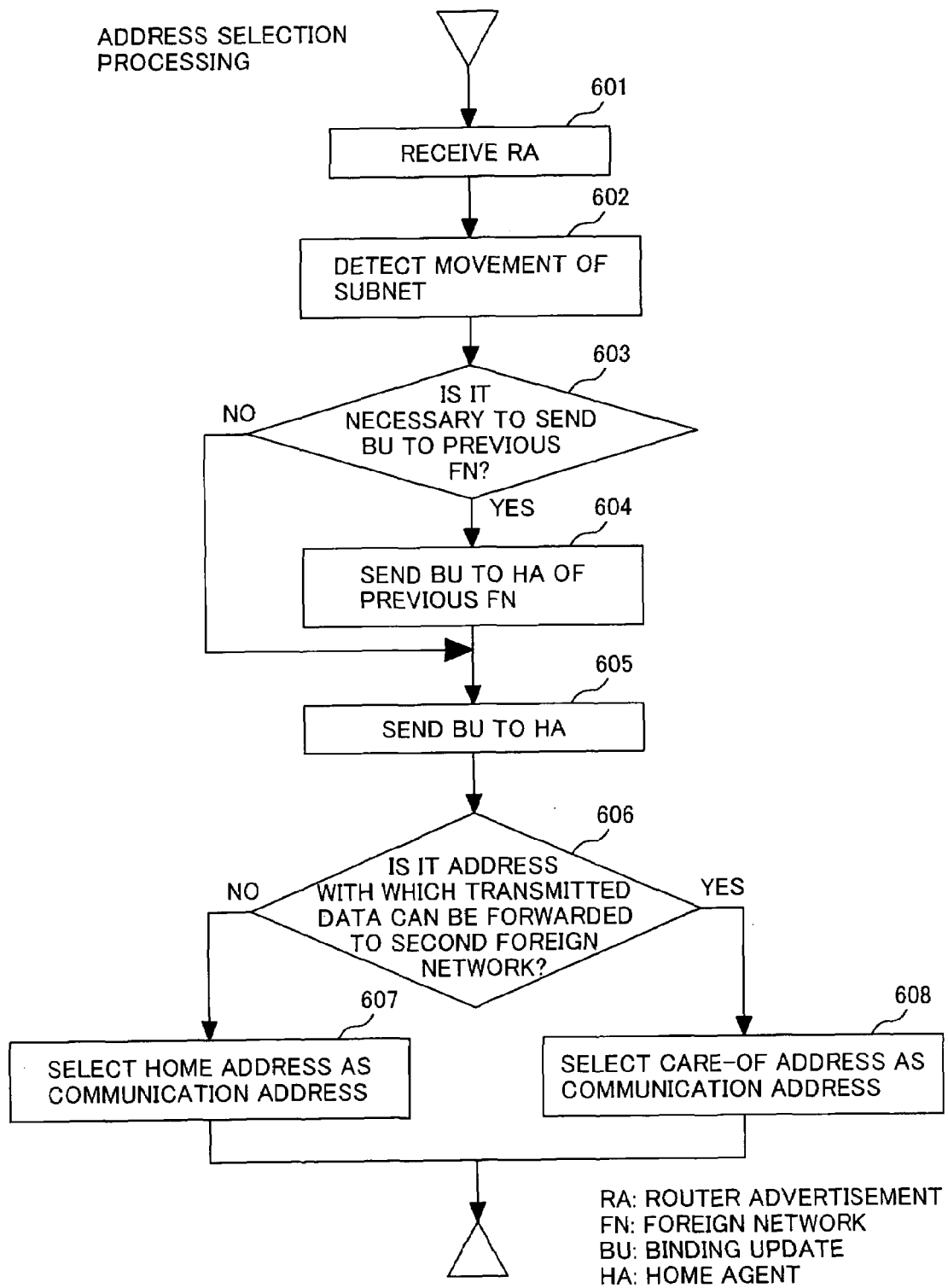
FIG. 3 is a flowchart showing a processing flow from foreign network movement detection to address selection that is performed in the mobile node.

FIG. 3 is a flowchart that shows a processing flow from movement detection to address selection processing that is executed in the mobile node (103).

The mobile node (103) receives the router advertisement sent by either a router or a home agent in a subnet to which the mobile node (103) is currently attached (step 601).

The mobile node (103) acquires a prefix of the foreign network from a prefix information option contained in the router advertisement and compares it with a prefix of the home network of the mobile node (103). The mobile node (103) detects whether the mobile node (103) has moved between subnets from a result of this comparison result (step 602).

The mobile node (103) that detected the movement judges whether it is necessary to send the binding update to the foreign network to which the mobile node (103) was previously attached (step 603). The judgment on the necessity of sending the binding update is performed by the use of the address attribute (5033) of the on-communication address management table (503). If the address attribute (5033) is the care-of address, the mobile node (103) judges that there is a necessity of sending it.

If it is judged that it is necessary to send the binding update, the mobile node (103) specifies a network to which the binding update must be sent from the use IP address (5032) of the on-communication address management table. The mobile node (103) further specifies a home agent to which the binding update is sent based on a home agent address (HA address) (411) and a priority (4113) in the home agent list (411), and sends the binding update to the home agent of a foreign network in which the mobile node (103) previously resided (step 604). If it is not necessary to send the binding update, the mobile node (103) does not send it.

The mobile node (103) sends the binding update to the home agent (102) of the mobile node (103) (step 605).

The mobile node (103) judges whether a home agent (105) on the foreign network 1 (104) to which the mobile node is currently connected has a function of forwarding a packet that was delivered to the current care-of address to the foreign network 2 (107) based on information in the network status table (504) (step 606).

If the judgment is that the forwarding is impossible, the mobile node (103) selects the home address as the communication address (step 607); if the judgment is that the forwarding is possible, the mobile node (103) selects a current care-of address as the communication address (step 608).

Figure 4:
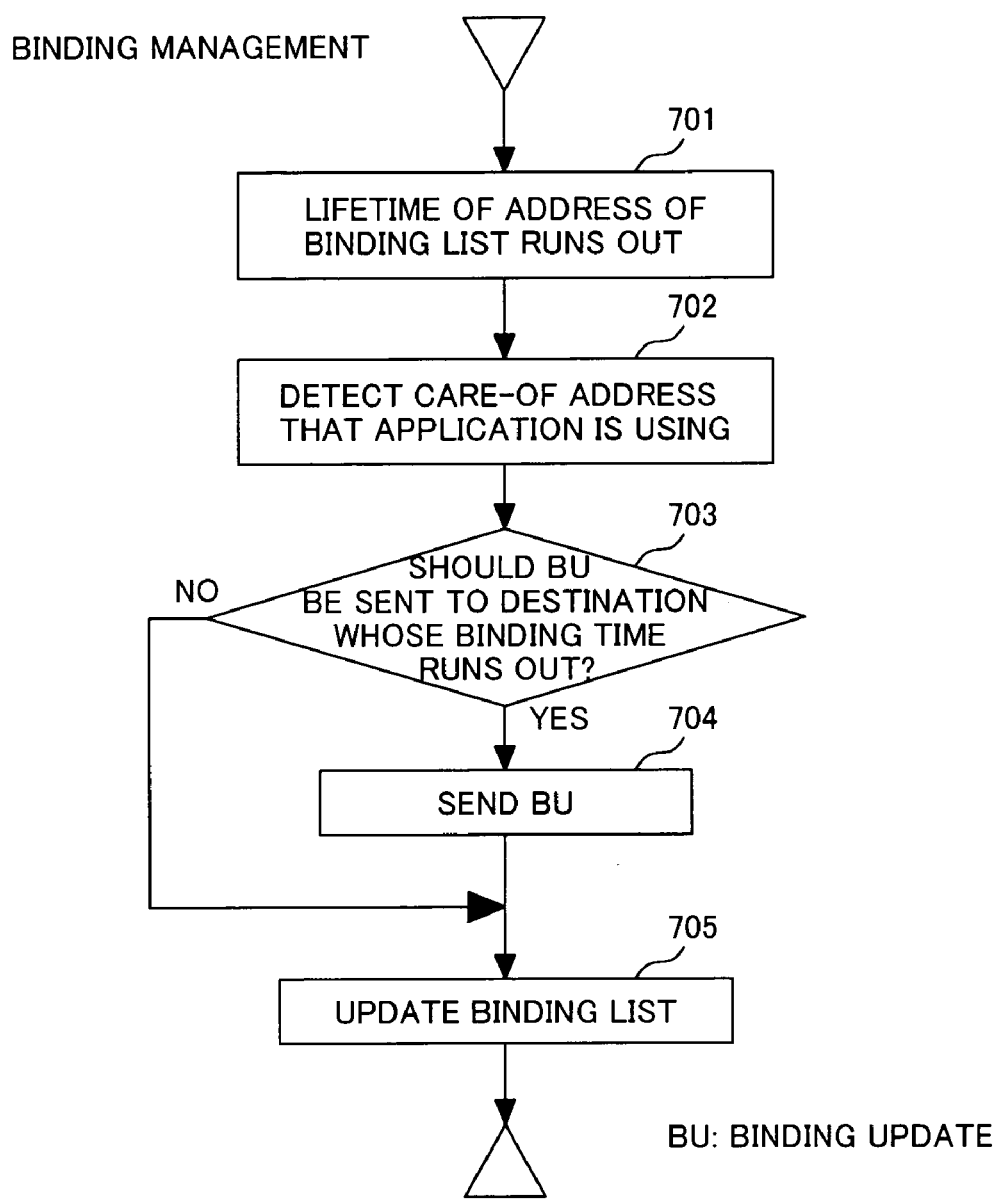
FIG. 4 is a flowchart showing a processing flow of binding management performed in the mobile node.

FIG. 4 is a flowchart showing a processing flow of the binding management performed in the mobile node (103).

When lifetime of an IP address (4124) registered in the binding list (412) runs out (step 701), the mobile node (103) searches the on-communication address management table (503) to detect a use IP address whose address attribute is a care-of address (step 702).

The mobile node (103) judges whether it is necessary to send the binding update to a destination whose binding time runs-out (4121) (step 703). If a network part of a destination (4121) whose binding time runs out agrees with a network of the IP address detected at step 702, an application is performing communication using a care-of address that designates a destination whose binding time runs out as the home agent. In this case, the mobile node (103) sends the binding update to an address of the binding list (step 704). If the agreement is not obtained, the mobile node (103) does not send the binding update.

The mobile node (103) updates the binding list (step 705). In the case where the binding update was not sent, the corresponding binding list is deleted; in the case where the binding update is sent, the lifetime of the corresponding binding list is updated in conformity to the lifetime of the sent binding update. The above processing flow will be explained referring to FIG. 1 again. Here it is assumed that the mobile node (103) has already moved from the home network (104) to the foreign network 1 and is moving from there to the foreign network 2.

The mobile node (103) selects the care-of address as the communication address in the foreign network 1 (104). Moreover, the mobile node (103) registers the care-of address at the IP address management server (108), and this procedure makes it possible for the terminal A (109) that communicates with the mobile address (103) to communicate with the mobile node (103) residing in the foreign network 1 (104) using a communication path that has been optimized from the start of the communication (Path 111).

Figure 8:
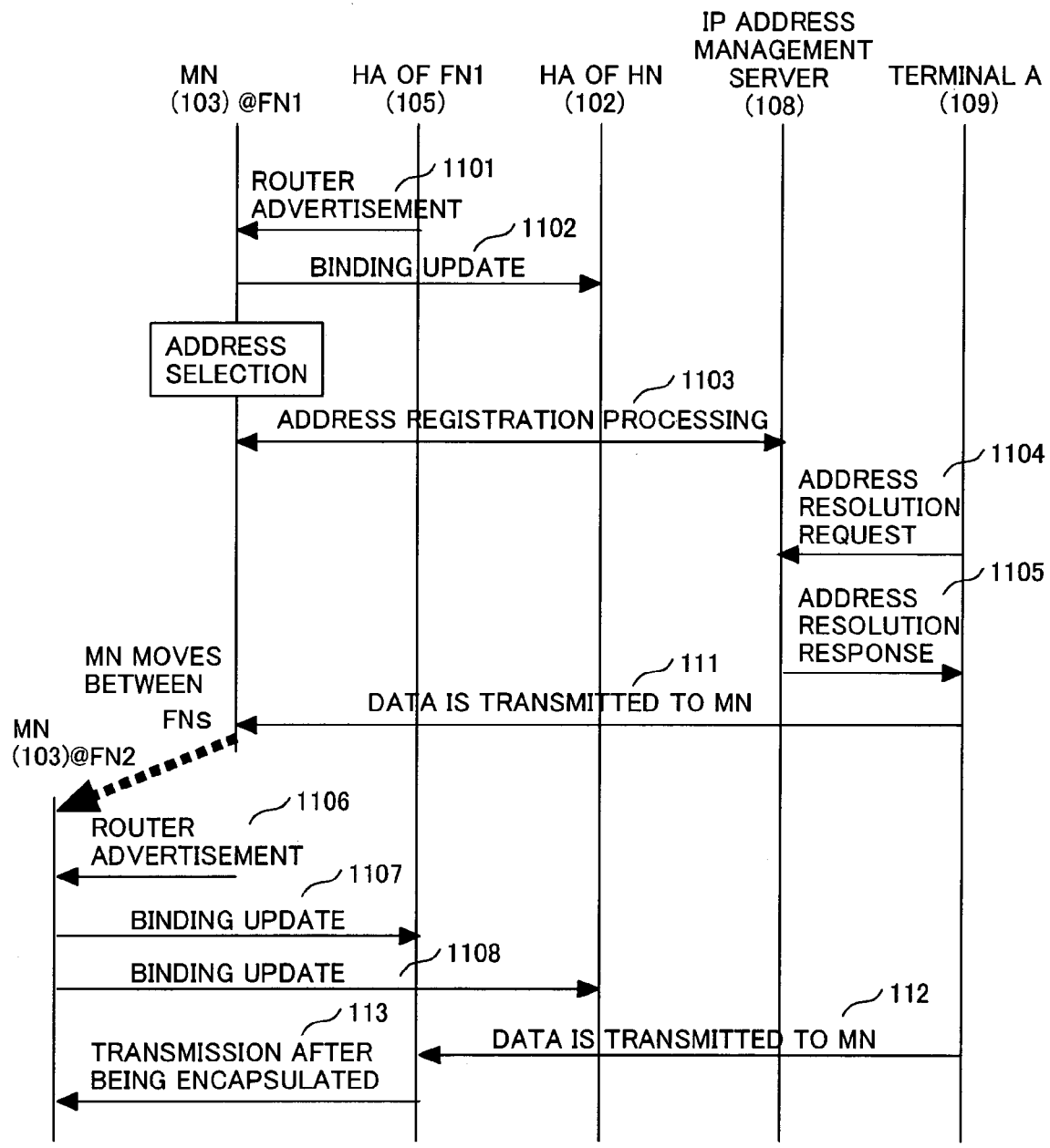
FIG. 8 is a sequence diagram explaining a process in which a communication path in a foreign network is optimized.

Moreover, when the mobile node (103) has moved to the foreign network 2 (106), this mobile node (103) sends the binding update to the home agent (105) on the foreign network 1 (104). Thereby, the home agent (105) belonging to the foreign network 1 (104) is enabled to capture IP packets sent to the mobile node's care-of address (Path 112) and forward it to the mobile node in the foreign network 2 (106) (Path 113); therefore a communication session can be maintained. FIG. 8 shows a communication sequence in which the mobile node (103) communicates with the terminal A (109) by the method for selecting an IP address according to this invention. Here, the above-mentioned communication sequence will be explained referring to FIG. 1 and FIG. 8. The mobile node (103) receives the router advertisement in the foreign network 1 (104), detects that it has moved between the networks (Event 1101), and sends the binding update to the home agent (102) of the mobile node (103) (Event 1102).

The mobile node (103) judges from the received router advertisement that the home agent (105) exists on the foreign network 1 (104), and packets addressed to the care-of address can be forwarded to another network. Then the mobile node (103) selects the care-of address as the communication address. The mobile node (103) registers the selected communication address at the IP address management server (Event 1103). The terminal A (109) that is going to start communication with the mobile node (103) inquires the mobile node's address at the IP address management server (108) (Event 1104) and resolves the address (Event 1105). The terminal A (109) sends IP packets to the care-of address of the mobile node acquired from the IP address management server (Event 111).

Here, the mobile node (103) moves to the foreign network 2 (106) from the foreign network 1 (104). The mobile node (103) receives the router advertisement in the visited foreign network 2 (106) (Event 1106) and detects the movement.

The mobile node (103) sends the binding update to the home agent (102) existing on the home network (101) of the mobile node (103) and the home agent (105) on the foreign network 1 (104) (Events 1107, 1108), and registers the current care-of address at the home agents (102, 105).

The IP packet sent to the care-of address of the foreign network 1 (104) from the communication terminal A (109) is captured (Event 112) and encapsulated by the home agent (105) on the foreign network 1 (104), and is forwarded to the mobile node (103) existing on the foreign network 2 (106) (Event 113).

Second Embodiment

Figure 9:
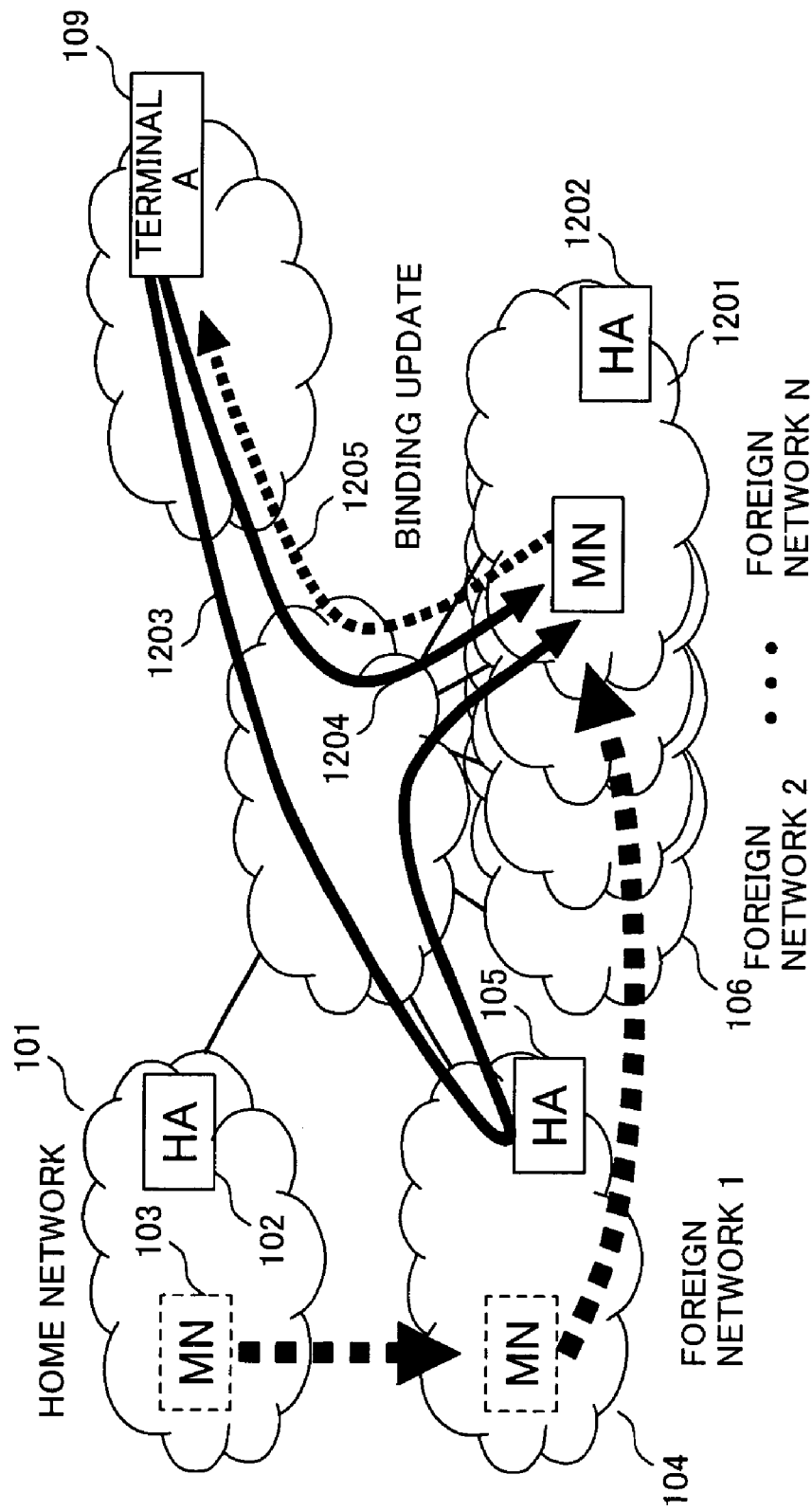
FIG. 9 is a conceptual diagram for explaining a process in which a home agent is changed over.

This invention will be described by taking an example where the mobile node (103) moves among a plurality of foreign networks one by one. FIG. 9 illustrates how the mobile node (103) is moving among the plurality of networks. When the mobile node (103) moved from a foreign network 1 in which exists a home agent (105) that the mobile node is using temporarily to the plurality of networks, and reached a foreign networks N (1201), namely an N-th foreign network (N: an integer more than 2, as counted from the foreign network 1) in which the mobile node (103) resides, in order to eliminate the overhead of communication caused by packets passing through the temporary home agent (105) (Path 1203) it is also possible for the mobile node (103) to perform communication by changing the temporary home agent to a neighboring home agent (1202) (Path 1204). Hereafter, this example will be explained.

Home agent change is done by the mobile node (103) sending the binding update message (Path 1205). A user of the mobile node can set up conditions for changing a temporary home agent as will be described below.

Figure 10:
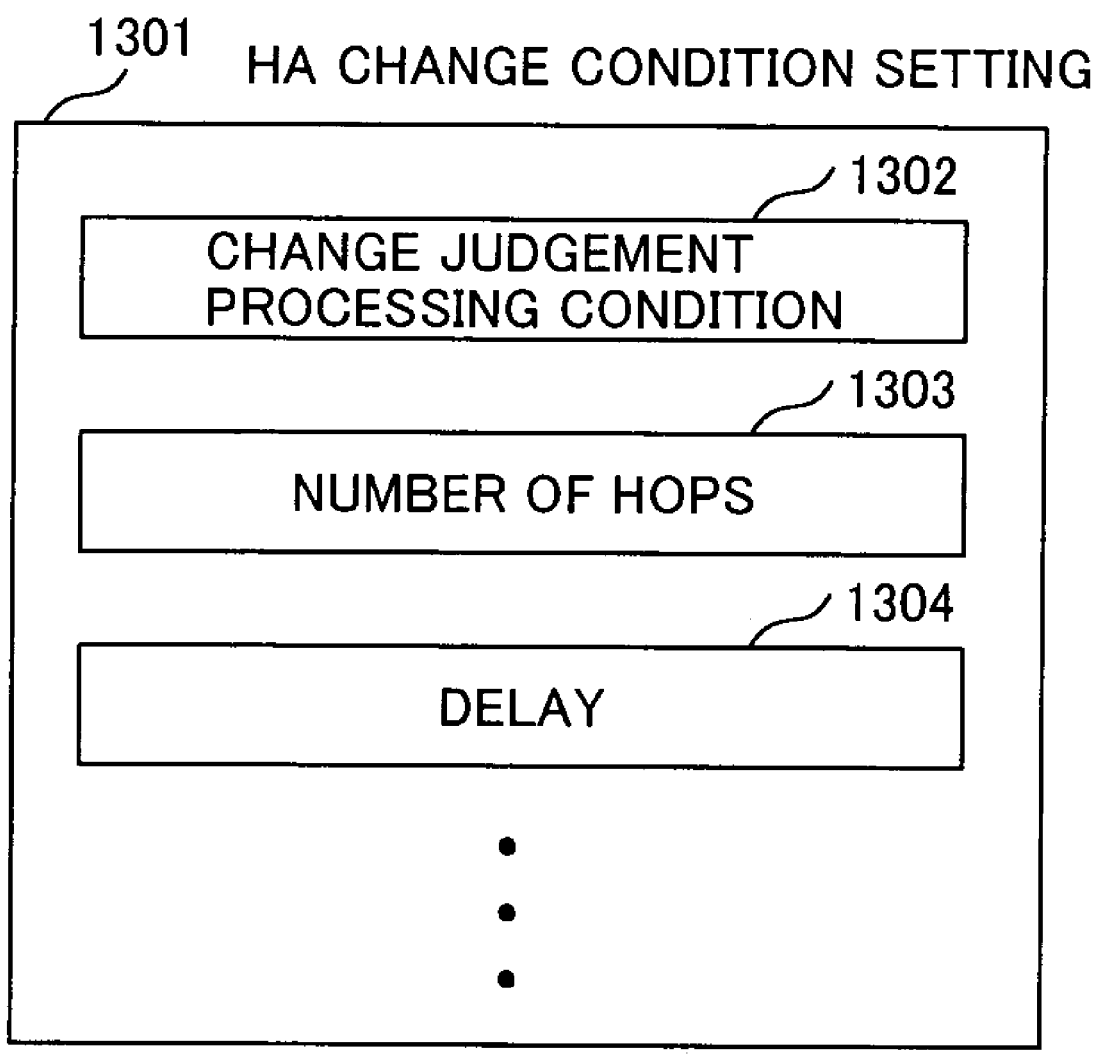
FIG. 10 is a conceptual diagram explaining the composition of a home-agent change conditions setting table.

FIG. 10 shows an example of the condition that the user of the mobile node sets up in advance. For home-agent change judgment conditions (1301), conditions for performing home-agent change judgment processing (1302) and values of the number of hops made with temporary home agents (1303), delay (1304), etc. are specified as conditions when the change is performed. Note that defaults values of these conditions may have been set in advance and the user may be allowed to change them according to the user's preference.

Figure 11:
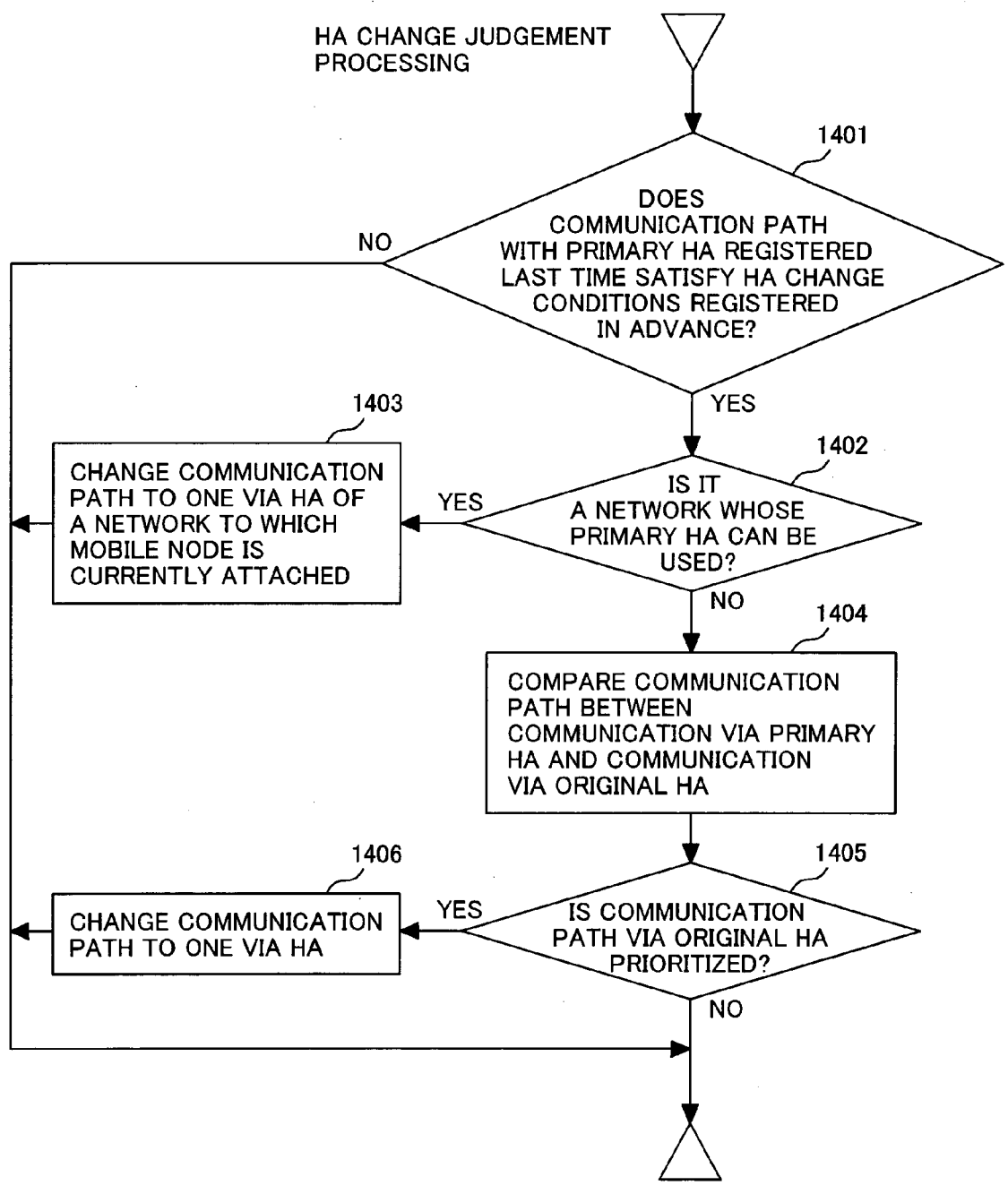
FIG. 11 is a flowchart showing a processing flow of changing a home agent that is performed in the mobile node.

FIG. 11 shows a processing flow of changing a home agent performed in the mobile node (103). The mobile node (103) judges whether a temporary communication path between the home agent (105) and the mobile node (103) that is currently being used satisfies the conditions under which the home-agent change is performed based on the change judgment conditions that have been set in advance (1301) (step 1401). If the conditions are not satisfied, the home-agent change processing is not performed.

If the conditions are satisfied, the mobile node (103) judges from the router advertisement whether a temporarily available home agent exists on the foreign network to which the mobile node (103) is currently attached (step 1402). If the temporary home agent can be used, a communication path with the terminal A is changed to the temporary home agent (1202) existing on the foreign network to which the mobile node (103) is currently attached (step 1403).

If a temporarily available home agent does not exist, the mobile node (103) compares which is prioritized, communication via the temporary home agent (105) that is currently being used or communication via the home agent belonging to the home network (101) of the mobile node (103) (step 1404).

If the communication via the home agent (102) belonging to the home network (101) of the mobile node (103) is judged to be prioritized (step 1405), the communication path is changed to a path via the home agent (102) belonging to the home network (101) of the mobile node (103) (step 1406). If the communication via the home agent that is currently being used (102) is judged to be prioritized, home-agent change processing is not performed.

When the home agent that is currently being used is changed to the temporary home agent (1202) of a foreign network N (1201) to which the mobile node (103) is currently attached, a normal binding update message is sent to the terminal A (109). When that home agent is changed to the home agent (102) belonging to the home network (101) of the mobile node (103), a binding update message of an alternate care-of address added with the home address of the mobile node (103) is sent to the home agent (102) belonging to the home network (101) of the mobile node (103).

Third Embodiment

An example in which this invention is applied in the case where a home agent does not exist on a foreign network to which the mobile node (103) is directly connected but a home agent exists on a foreign network that is upstream from that foreign network.

Figure 12:
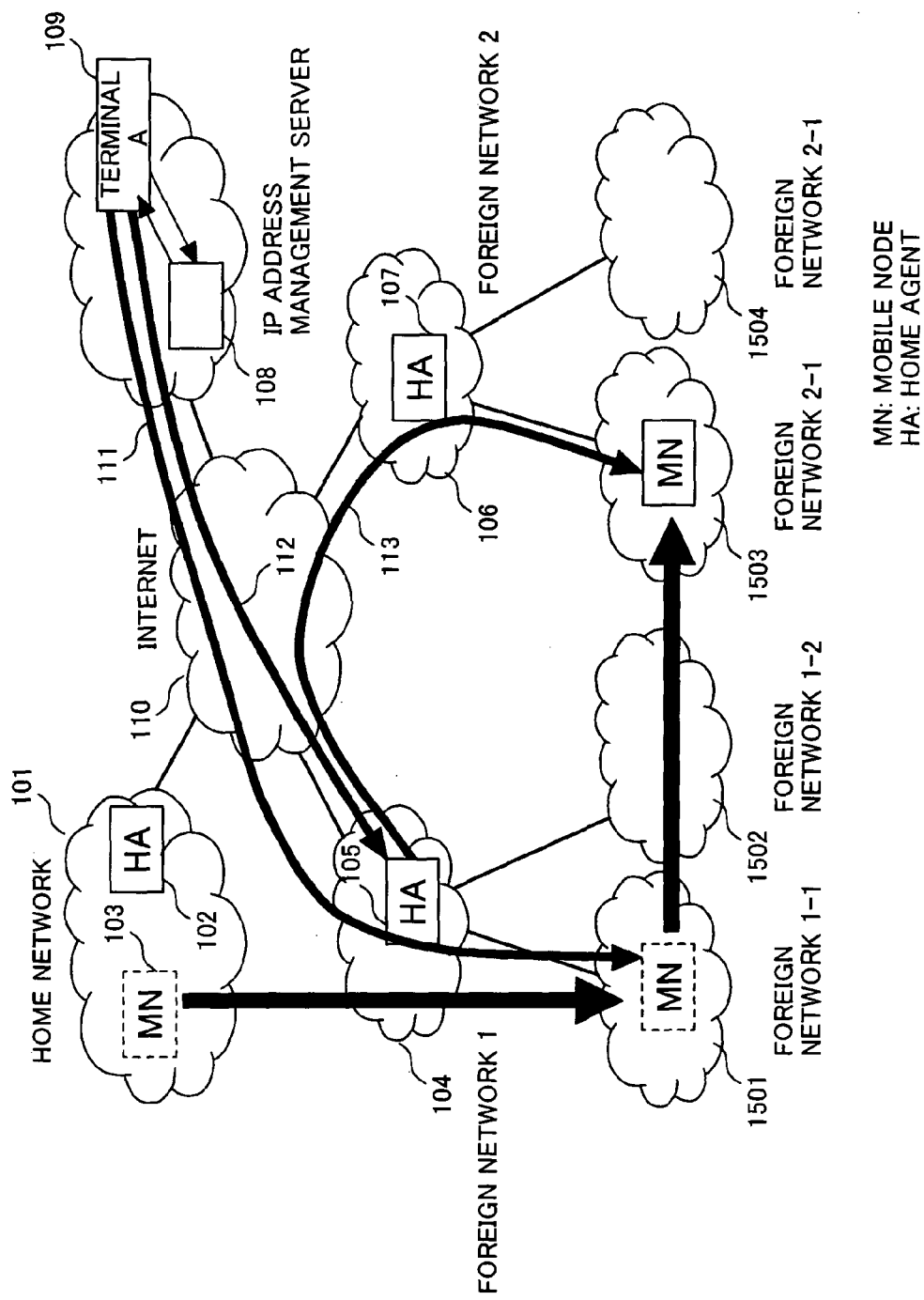
FIG. 12 is a view showing an example in which this invention is applied to a network such that a temporary home agent does not exist on a foreign network to which the mobile node is directly connected.

FIG. 12 shows an example where the temporary home agent (105) exists upstream from a foreign network 1-1 (1501) to which the mobile node (103) is directly connected. The foreign network 1-1 (1501) and a foreign network 1-2 (1502) have a hierarchical structure of connection such that the two are connected to a lower layer of the foreign network 1 (104).

The temporary home agent (105) is arranged in the foreign network 1 (104) that is located in the upper level of the foreign network 1-1 (1501) and the foreign network 1-2 (1502). Thereby, the data addressed to the mobile node (103) reaches the mobile node (103) surely via the foreign network 1 (104) where the temporary home agent (105) exists, and consequently it becomes possible to capture packets sent to the mobile node (103) from the terminal A (109) as in the case of the temporary home agent (105) described in the first embodiment.

Moreover, for the router advertisement sent out in the foreign network 1-1 (1501), a router advertisement of mobile IP extension, and an address of the temporary home agent (105) existing on the foreign network 1 (104) is set as a prefix information option. Thereby, the mobile node (103) can recognize existence of the temporary home agent (105) arranged upstream from the foreign network 1-1 (1501). In this way, the mobile node (103) can communicate with the terminal A (109) using the same method as was described in the first embodiment.

What is claimed is:

1. A packet communication system comprising packet communication devices that are arranged in a plurality of foreign networks, respectively, and that are at least part of foreign networks existing as networks visited by a mobile node, wherein when the mobile node moved among the plurality of foreign networks, if a packet communication device is arranged in a visited foreign network, the mobile node is given by the packet communication device a care-of address that corresponds to the visited foreign network in a one to one manner, the mobile node continuously sends information pertinent to an updated care-of address given in the most recently visited foreign network, after moving through at least three foreign networks, to at least one of the packet communication devices arranged in the at least three foreign networks in which the mobile node visited previously, and a packet that is sent from a corresponding node designated to the mobile node at a care-of-address given in a respective previously visited foreign network is transferred from the packet communication device of the respective previously visited foreign network directly to the updated care-of-address.

2. The packet communication system according to claim 1, wherein at at least one point of time selected from a group consisting of points of time when applications are started in the mobile node and points of time when the applications having been started in the mobile node start to exchange packets via the Internet, the mobile node sends continuously information pertinent to its care-of address that is acquired when, after residence in one foreign network, the mobile node has moved to another foreign network to a packet communication device that was in service at the start of the application and is a packet communication device existing on the foreign network in which the mobile node resided.

3. The packet communication system according to claim 2, wherein the mobile node stops continuation of sending of the information to the packet communication device that was in service at the start of the application after the application is ended.

4. The packet communication system according to claim 1, wherein the packet communication device that will be a target to which the information is sent continuously is selected in correspondence with at least either a state of or a communication purpose of the foreign network in which the moved mobile node resides.

5. The packet communication system according to claim 1, wherein when the number of hops between the packet communication device when the information started to be transmitted and the packet communication device existing on the foreign network in which the mobile node resides exceeds a predetermined value, continuation of sending of the information is stopped.

6. The packet communication system according to claim 1, further comprising conditions setting means that allows the user of the mobile node to set conditions in advance, wherein when the conditions being set by the condition setting means are satisfied, continuation of sending of the information is stopped.

7. A communication network comprising packet communication devices that are arranged in a plurality of foreign networks, respectively, and that are at least part of foreign networks existing as networks visited by a mobile node, wherein when the mobile node moved among the plurality of foreign networks, if the packet communication devices are arranged in the visited foreign networks, the mobile node is given by the packet communication device a care-of address corresponding to each of the visited foreign networks in a one to one manner, after moving through at least three foreign networks, information pertinent to an updated care-of address given by the most recently visited foreign network is continuously sent from the mobile node to at least one of the packet communication devices arranged on each the at least three foreign networks in which the mobile node visited previously, and a packet that is sent from a corresponding node designated to the mobile node at a care-of-address given in a respective previously visited foreign network is transferred from the packet communication device of the respective previously visited foreign network directly to the updated care-of-address.

8. A method for selecting an IP address in a mobile node comprising the steps of:
arranging packet communication devices in a plurality of foreign networks that are at least part of foreign networks existing as networks visited by the mobile node, respectively;
when the mobile node moves among the plurality of foreign networks, if a packet communication device is arranged in a visited foreign network, giving the mobile node a care-of address that corresponds to the visited foreign network in a one to one manner;
after the mobile node moved through at least three foreign networks, sending information pertinent of an updated care-of address given in the most recently visited foreign network continuously from the mobile node to at least one of the packet communication devices arranged in the at least three foreign networks in which the mobile node visited previously, and
transferring a packet that is sent from a corresponding node designated to the mobile node at a care-of-address given in a respective previously visited foreign network from the packet communication device of the respective previously visited foreign network directly to the updated care-of-address.

9. The packet communication system according to claim 1, wherein the mobile node sends the updated care-of-address given in the most recently visited foreign network to packet communication devices of all previously visited foreign networks.

* * * * *